(12) United States Patent
Sauermann

(10) Patent No.: US 7,685,510 B2
(45) Date of Patent: Mar. 23, 2010

(54) SYSTEM AND METHOD FOR GROUPING DATA

(75) Inventor: Volker Sauermann, Heidelberg (DE)

(73) Assignee: SAP AG, Walldorf (DE)

( * ) Notice: Subject to any disclaimer, the term of this patent is extended or adjusted under 35 U.S.C. 154(b) by 840 days.

(21) Appl. No.: 11/022,124

(22) Filed: Dec. 23, 2004

(65) Prior Publication Data

US 2006/0143563 A1    Jun. 29, 2006

(51) Int. Cl.
G06F 17/00    (2006.01)
(52) U.S. Cl. ............................. 715/227; 715/228
(58) Field of Classification Search .............. 715/509, 715/212, 510, 227, 228
See application file for complete search history.

(56) References Cited

U.S. PATENT DOCUMENTS

| | | | |
|---|---|---|---|
| 5,317,686 A * | 5/1994 | Salas et al. ................. 715/212 |
| 5,510,980 A | 4/1996 | Peters | |
| 5,668,987 A | 9/1997 | Schneider | |
| 5,745,891 A | 4/1998 | Minakuchi et al. | |
| 5,752,025 A | 5/1998 | Shakib et al. | |
| 5,883,635 A * | 3/1999 | Rao et al. ................... 345/440 |
| 5,893,127 A | 4/1999 | Tyan et al. | |
| 6,016,502 A | 1/2000 | Haneda et al. | |
| 6,085,202 A * | 7/2000 | Rao et al. ................... 715/509 |
| 6,112,214 A | 8/2000 | Graham et al. | |
| 6,147,685 A * | 11/2000 | Bliss et al. ................. 715/769 |
| 6,148,885 A | 11/2000 | Spragg et al. | |
| 6,189,003 B1 * | 2/2001 | Leal ............................. 707/2 |
| 6,212,524 B1 * | 4/2001 | Weissman et al. .......... 707/101 |
| 6,232,967 B1 | 5/2001 | Kelley et al. | |
| 6,295,527 B1 | 9/2001 | McCormack et al. | |
| 6,327,590 B1 | 12/2001 | Chidlovskii et al. | |
| 6,421,662 B1 * | 7/2002 | Karten ......................... 707/3 |
| 6,442,575 B2 * | 8/2002 | Pratley et al. ............... 715/212 |
| 6,487,567 B1 | 11/2002 | Michelman et al. | |
| 6,523,040 B1 * | 2/2003 | Lo et al. ...................... 707/101 |
| 6,626,959 B1 | 9/2003 | Moise et al. | |
| 6,792,431 B2 * | 9/2004 | Tamboli et al. ............. 707/102 |
| 6,801,901 B1 * | 10/2004 | Ng ................................ 705/28 |
| 6,816,868 B1 * | 11/2004 | Shimizu ...................... 707/102 |
| 6,907,422 B1 * | 6/2005 | Predovic ......................... 707/2 |
| 2001/0049699 A1 * | 12/2001 | Pratley et al. ............... 707/503 |
| 2002/0069220 A1 | 6/2002 | Tran | |
| 2002/0161795 A1 | 10/2002 | O'Rourke | |

(Continued)

OTHER PUBLICATIONS

Yang et al., Fractal Summarization for Mobile Devices to Access Large Documents on the Web, ACM 2003, pp. 215-224.*

(Continued)

Primary Examiner—Cong-Lac Huynh
(74) Attorney, Agent, or Firm—Kenyon & Kenyon LLP

(57) ABSTRACT

In a system and method for grouping data, a processor may, with reference to metadata identifying relationships between sets of data to be displayed in columns of a table, generate a display template from the identified relationships, the template defining that related columns of data are presented adjacent to each other in groups and defining which types of graphical demarcations to display, may search among records corresponding to rows of the table to be displayed for records that satisfy a search criterion, and may display a table according to the display template, rows of the table arranged to display the records that satisfy the search criteria in a group separate from the other records.

5 Claims, 7 Drawing Sheets

U.S. PATENT DOCUMENTS

| | | | |
|---|---|---|---|
| 2003/0126152 A1* | 7/2003 | Rajak | 707/101 |
| 2003/0145277 A1 | 7/2003 | Neal et al. | |
| 2003/0174179 A1 | 9/2003 | Suermondt et al. | |
| 2004/0030689 A1 | 2/2004 | Anderson et al. | |
| 2004/0093321 A1 | 5/2004 | Roustant et al. | |
| 2004/0163039 A1* | 8/2004 | Gorman | 715/505 |
| 2004/0167800 A1* | 8/2004 | Chang et al. | 705/2 |
| 2005/0021492 A1* | 1/2005 | Safaei et al. | 707/1 |
| 2005/0050031 A1* | 3/2005 | Matsumoto | 707/3 |
| 2005/0120293 A1* | 6/2005 | Benhase et al. | 715/504 |
| 2005/0154974 A1* | 7/2005 | Gao et al. | 715/509 |
| 2005/0160379 A1* | 7/2005 | Roberts | 715/853 |
| 2005/0289455 A1* | 12/2005 | Hays et al. | 715/513 |
| 2006/0064313 A1* | 3/2006 | Steinbarth et al. | 705/1 |
| 2006/0074953 A1* | 4/2006 | Dettinger et al. | 707/101 |
| 2006/0074961 A1* | 4/2006 | Kongalath et al. | 707/102 |
| 2006/0075396 A1* | 4/2006 | Surasinghe | 717/168 |
| 2006/0150096 A1* | 7/2006 | Thacker et al. | 715/525 |
| 2006/0195345 A1* | 8/2006 | Close et al. | 705/7 |
| 2006/0265403 A1* | 11/2006 | Mercer et al. | 707/10 |

OTHER PUBLICATIONS

Trevor et al., From Desktop to Phonetop: A UI for Web Interaction on Very Small Devices, ACM 2001, pp. 121-130.*

Chaudhuri et al., Robust and Efficient Fuzzy Match for Online Data Cleaning, ACM 2003, pp. 313-324.*

Ryall et al., Exploring the Effects of Group Size and Table Size on Interactions with Tabletop Shared-Display Groupware, ACM 2004, pp. 284-293.*

Jill Tremble, Simulation-based Planning and Scheduling, http://www.visual8.com/News02b.html.

http://www.clarku.edu/offices/its/kb/deskpub/msoffice/excel/Excel2001.pdf, Excel 2001, p. 1-23.

http://www.ithaca.edu/students/nlyons1/content/qg/databases.pdf, Excel 2002, Databases, Creating and managing databases in Microsoft Excel, p. 1-5.

Elizabeth Wells, Intermediate, Microsoft Access 2000, Dec. 2001, p. 1-36, http://www.gre.ac.uk/it-courses/downloads/manuals_pdf/office2000/Access_2000_Intermediate.pdf.

http://sapdesignguild.org/resources/ma_guidelines/VisualDesignRules/colors.html, Colors, HTML, Web Palette, p. 1-3 (Last visited Jul. 16, 2004).

MacGregor.net, MacGregorMedia, Words—The Guide to Good Tables p. 1-10 (Last visited May 3, 2007).

http://sapdesignguild.org/resources/ma_guidelines/interaction/shuffler.html, Filtering Data—The Shuffler, p. 1-4. (Last visited Jul. 16, 2004).

BrainJar.com, Table Sort, Altering the Table Display, p. 1 of 2 (Last visited May 3, 2007).

http://www.bambookit.com/table.html, Bambookit GUI Table Features, p. 1-2 (Last visited Jul. 16, 2004).

http://www.sapdesignguild.org/resources/ma_guidelines/Interaction/layout.html, Layout, p. 1-4 (Lasted visited Jul. 16, 2004).

PEXlip 5.2 Specification—Lookup Tables—Highlight Tables, Highlight Table, p. 1-2 (Last visited May 3, 2007).

http://www.ojp.usdoj.gov/search97/doc/user/11_is 1.htm, Dynamic Highlighting, p. 1-2 (Last visited Jul. 28, 2004).

http://www.haestad.com/CCNews/article.asp?issieid=10001 &article=includes/A10016.inc, Haestad Methods, ClinicalCare NewsLetter, p. 1-3 (Last visited Jul. 28, 2004).

http://www.ozgrid.com/Services/advanced-excel-find.htm, Advanced Excel Find Add-in, p. 1-4 (Last visited Jul. 29, 2004).

http://www.datarebels.com/scgi_ bin/?request=html/technology_position, Introduction to Datarebels Technology, p. 4-9 (Last visited Jul. 28, 2004).

http://www.exceltip.com/st/Color_rows_ according_ to_criteria_in_Mircosoft_ Excel/256.html, color rows according to criteria in Microsoft Excel, p. 1-4 (Last visited Jul. 29, 2004).

Filipe Silva and Gabriel David, Searching a Database Based Web Site, 2 pages (2003).

* cited by examiner

Search criteria entry form 600

Table 702

Column 704

FIG. 7

SYSTEM AND METHOD FOR GROUPING DATA

BACKGROUND

A collection of data may include a number of groups of data. For example, a computer file may include a number of categories of data. Each category of data may further include sub-categories of data. A computer processor may output the data according to the categories and sub-categories via an output device.

For example, a computer memory may include a plurality of records. Each of the records may include data pertaining to a number of categories. The computer processor may arrange the data in a table, where each row may correspond to a particular record, and each column may correspond to a particular category. A number of columns may further correspond to a main category, so that the category to which each of the number of columns corresponds is a sub-category of the main category. The processor may output the table in any conventional manner. For example, the processor may output the table for display on a computer monitor, or transmit the table to a printer to print out the table. The grouping of the data into columns may identify the individual categories of information to a user. However, the column groupings do not identify which groups of columns belong to a particular main category.

It is conventional to include in a computer program, code for color-coding the columns according to main categories to which the columns belong. For example, when executing the code, the processor may group together and highlight in one color columns that belong to one main category, and may group together and highlight in a different color columns that belong to a different main category.

However, if the computer program is configured to run on one operating system and is then run on a different operating system, the program may display the columns with the wrong colors. For example, the program may display all columns with the same color, and may therefore fail to identify which groups of columns belong to a particular main category.

A user may search for data elements within groups of data that match particular search criteria. For example, the user may search for matches to a particular data string within the columns of data. As a result of the search, the processor may highlight all matching data elements, e.g., records including data within the searched columns that match the search criteria. To find the matching data elements, the user may scan the searched columns for all highlighted data elements. However, especially where a column includes a very large amount of data so that the user must scroll to see all of the data, it may be difficult for the user to find all of the matching data elements. The user may even mistakenly overlook some highlighted data.

It is conventional for the processor to provide a list of only the subset of records that include the matching data elements. However, to ascertain how the list of the subset of records relates to the original list of records, the user must perform a line-by-line comparison.

It is also conventional for a computer application to provide a way to sort columns by particular values, e.g., alphabetically. If each row of a column would include only one value that includes a single string, then the processor would group together all rows including a matching data string since the rows all include a data string that is positioned in the same way according to the sort. However, if rows include more than one value or more than one string, then rows including a matching string might not be grouped together. For example, the user may instruct the processor to sort records so that data of a particular column is alphabetically arranged. The user may search the column for records that include the string, "United States." A record that includes the string "Canada, United States" as the data corresponding to the searched column will not be grouped together with a record that includes the string "United States" as the data corresponding to the searched column.

Accordingly, there is a need in the art for a system and method for grouping data to identify categories of data and sub-categories of data in a platform-independent manner, and to aid a user in identifying data that match search criteria.

BRIEF DESCRIPTION OF THE DRAWINGS

FIG. 7 is a screenshot of an example window in which all matching records are highlighted in a selected column, according to an embodiment of the present invention.

DETAILED DESCRIPTION

Embodiments of the present invention generally relate to a computer system and method that determines a way in which to group, display, and highlight data. Embodiments further relate to a computer system and method that determines a type of divider to display between two groups of data based on a relationship between the two groups of data, and that groups together data that satisfy search criteria. The embodiments particularly, though not exclusively, relate to data of an administration tool of a search engine.

Figure 1:
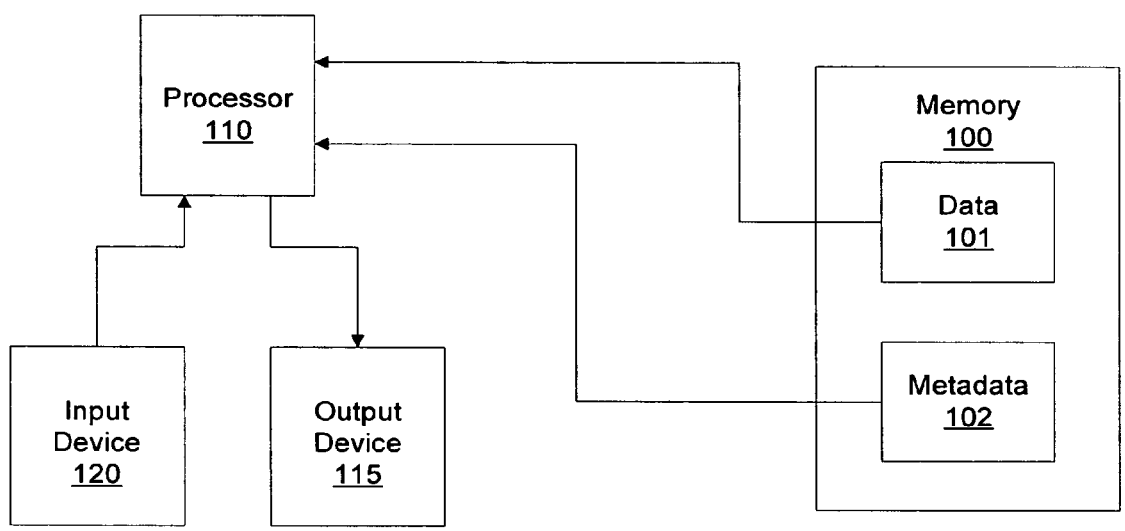
FIG. 1 is a block diagram that illustrates components of an example system according to an embodiment of the present invention.

FIG. 1 is a block diagram that illustrates components of an example system according to an embodiment of the present invention. Data files may be stored in a memory 100. The data files may include data 101 and metadata 102. Metadata 102 may include information regarding the interrelationships between data elements of data 101, e.g., the interrelationships between pairs of datasets. A processor 110 may output the data 101 via an output device 115, e.g., a computer monitor, printer, or any other conventional output device, according to the metadata 102. For example, the processor 110 may display on the computer monitor 115 a table, where each column includes a corresponding dataset of data 101. The processor 110 may determine based on the metadata 102 which columns of data to adjacently display and which of several types of graphical demarcations to display to separate the columns.

The processor 110 may determine a category and main category to which each of a number of datasets of data 101 and their corresponding columns belong. The processor 110 may group together columns (i.e., data groups) of a single main category (i.e., into a super-group) so that they are adjacently displayed. The processor 110 may display a first type of column divider between two columns that are of the same main category, and a second type of column divider between two columns that are of different main categories.

Figure 2:
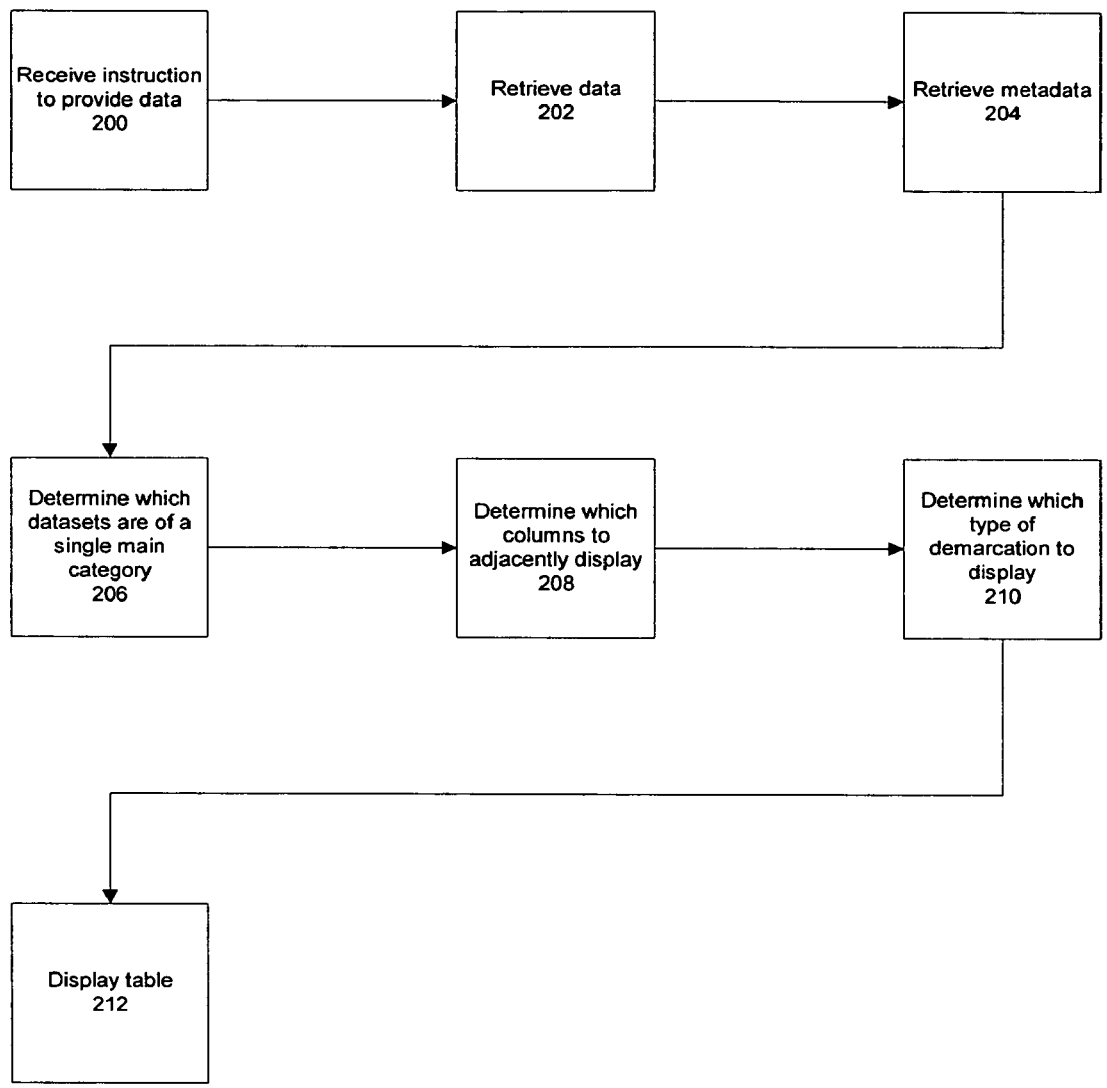
FIG. 2 is a flowchart that illustrates an example procedure for displaying a table according to data relationships, according to an embodiment of the present invention.

FIG. 2 is a flowchart that illustrates an example procedure executed by a processor to display a table according to an embodiment of the present invention. In 200, the processor may receive an instruction to provide data in a table, where each column of the table corresponds to a dataset. In 202, the processor may retrieve the data to be provided. In 204, the processor may retrieve metadata that includes information about the interrelationships between datasets of the retrieved data. In 206, based on the metadata, the processor may determine which datasets are of a single main category. In 208, based on the determination in 206, the processor may determine which columns to adjacently display, e.g., columns that include datasets of a single main category. In 210, based on the determination in 206, the processor may determine which type of graphical demarcations to display between each pair of columns that are to be adjacently displayed. In 212, the processor may display the table according to the determinations in 208 and 210.

An example system to which the present invention may be applied is that of a search engine administration tool. The search engine may obtain documents and store them in one or more document queues, e.g., as document queue files. The search engine may store the files in the memory 100 of FIG. 1. The search engine may index a document of a queue, e.g., based on terms within the document, the Uniform Resource Locator (URL) of the document, or anything else upon which it is conventional to base an index. The search engine may store one or more indices in the memory 100, for example, as a file. The search engine may implement an administration tool computer program to control the administration of the document queues and the indexing of the documents. The processor 110 may perform the tasks of the administration tool. The processor 110 may receive the documents, arrange the documents in files, store the files in the memory 100, retrieve documents from the document queues, parse the documents, index the documents, etc.

The processor 110 may output data of the administration tool via the output device 115. For example, the processor 110 may display on the computer monitor 115 a table, where each row relates to a corresponding document of a particular document queue or of all document queues, and where each column, representing a particular category of data, includes data of or about the listed documents.

For example, the table may provide information regarding a processing stage undergone by a document at a particular time. A document may undergo three main stages: (a) preprocess; (b) index; and (c) optimize. One or more columns may be associated with each main stage. Each main stage may include sub-stages. For example, a document in the preprocess stage may be in a "to be processed" stage if the document awaits preprocessing, in a "preprocessing" stage if the document is being preprocessed, or in a "preprocessing failed" stage if an error occurred during preprocessing of the document. A document in the index stage may be in a "to be indexed" stage if the document has been preprocessed and is awaiting indexing, in a "indexing" stage if the document is undergoing a transmission to a location where the document may be incorporated into an index, or in an "indexing failed" stage if an error occurred during transmission of the document. A document in the optimize stage may be in a "to be optimized" stage if the document has been successfully transmitted and is awaiting optimizing, in an "optimizing" stage if the document is being incorporated into an index, in an "optimizing failed" stage if an error occurred during optimizing of the document, or in an "optimized" stage if the document has been successfully optimized and is available for searching. Of the columns associated with a main stage, each column may be associated with a corresponding sub-stage of the main stage.

Figure 3:
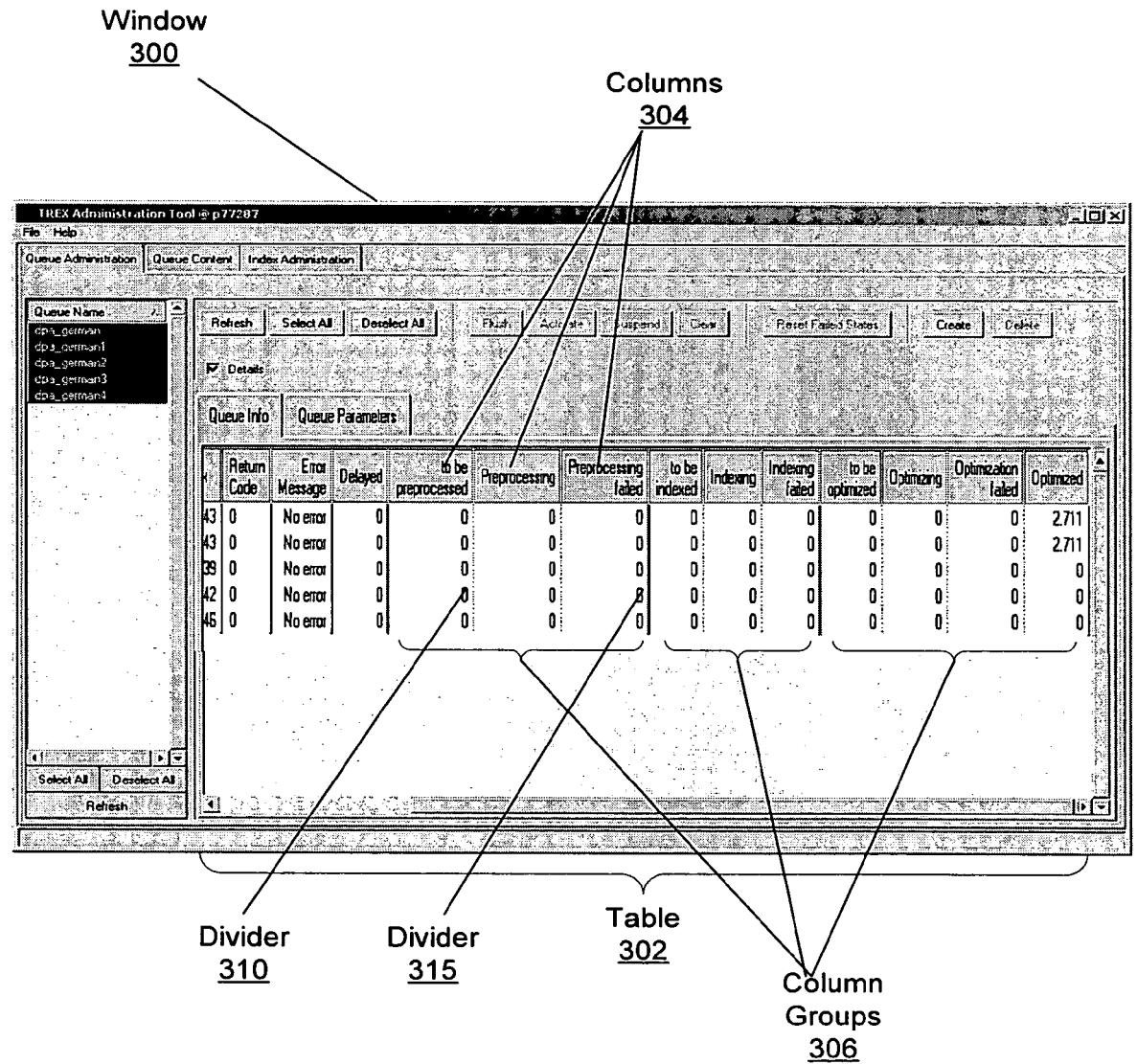
FIG. 3 is a screenshot of an example window displayed according to data relationships, according to an embodiment of the present invention.

FIG. 3 is a screenshot of an example window 300 displayed by the processor 110 of FIG. 1 on the computer monitor 115, according to an embodiment of the present invention. A table 302 may list the documents present in the search engine computer system. The table 302 may include a plurality of rows. Each row may be assigned to a corresponding document and may include data pertaining to the corresponding document. The table 302 may include a plurality of columns. Each column may be assigned to a corresponding category of data. The columns may include columns 304 which may represent sub-categories of data. The processor 110 may adjacently display a number of columns 304 that together correspond to a main category of data to form column groups 306. Accordingly, each column group 306 may represent a main category of data. For example, the table 302 may include columns "to be processed," "preprocessing," and "preprocessing failed," as the columns 304 which may form a "preprocess" column group 306.

In an embodiment of the present invention, for each pair of adjacently displayed columns of table 302, the processor 110 may determine whether the columns share a column group 306. If the processor 110 determines that the columns share a column group 306, the processor 110 may display in the table 302 a first type of divider 310 to separate between the two columns 304. Otherwise (if the columns belong to different column groups 306 or do not belong to a column group 306), the processor 110 may display in the table 302 a second type of divider 315 to separate between the two columns. The dividers 310 and 315 may differ so that the dividers help a user determine which columns 304 belong to a particular column group 306. For example, one of the dividers may be a thin vertical line, and the other may be a thick vertical line; one of the dividers may be an unbroken vertical line, and the other may be a broken vertical line; one of the dividers may be a dashed vertical line, and the other may be a dotted vertical line, etc.

In an embodiment of the present invention, the processor 110 may receive user-instructions via an input device 120. The input device 120 may be any conventional input device, e.g., a keyboard or a mouse. The processor 110 may receive an instruction from a user to display only data that pertains to particular categories of data, and in response may display in the table 302 only those columns that represent the selected categories. For example, in response to a user-instruction, the processor 110 may omit the columns "preprocessing," "indexing," and "optimizing" from the table 302. Based on the metadata 102, the processor 110 may determine which of the remaining columns of data to adjacently display. The processor 110 may accordingly adjacently display columns "to be preprocessed" and "preprocessing failed"; "to be indexed" and "indexing failed"; and "to be optimized," "optimization failed," and "optimized."

Based on the metadata 102, the processor 110 may also determine between which two of the remaining columns to display the divider 310 and between which two of the remaining columns to display the divider 315. For example, the processor 110 may display the divider 310 between the columns "to be preprocessed" and "preprocessing failed," and may display the divider 315 between the columns "preprocessing failed" and "to be indexed."

In one example embodiment of the present invention, the metadata 102 may include rules for displaying column dividers. For example, the rules may describe features of a first divider to be displayed between columns that belong to the same main category, and the features of a second divider to be displayed between columns that do not belong to the same main category.

For each column, the metadata 102 may also include information indicating a main category to which the column belongs. For example, the table may include data regarding five main categories. For each column, the metadata 102 may include a main category number (1-5) indicating the main category to which the column belongs.

A number of columns may belong to a single main category. Columns of the same main category may be grouped together in the displayed table. Therefore, for each column of a group, the metadata 102 may include a position number indicating the column's position in the group. For example, if a main category includes six columns, each of the columns may be assigned a number 1-6 indicating whether the column is displayed first, second, third, fourth, etc. in the group.

In an embodiment of the present invention, after the processor 110 receives an instruction to display particular columns of the table, the processor 110 may determine from the columns' main category numbers which columns are to be grouped together. The processor 110 may then determine from the position number the order in which the selected columns are to be displayed. For example, if a user selects three of six columns that belong to a group, e.g., columns 2, 4, and 5, the processor 110 may determine that column 2 is to be displayed at a left-most position of the group of columns, column 4 is to be displayed in a middle position of the group, and column 5 is to be displayed at a right-most position of the group.

The processor 110 may then display the selected columns according to the main category numbers and the position numbers.

In an embodiment of the present invention, the processor 110 may then assign to each column that is to be displayed a new temporary position number 1-4 (in addition to the position number of metadata 102). 1 may indicate that the column is displayed at a left-most position of a group of columns. 2 may indicate that the column is displayed at a right-most position of a group. 3 may indicate that the column is one of the inner displayed columns of the group. 4 may indicate that the column is the only column of the group that is displayed. The processor 110 may display dividers between displayed columns according to the additional position numbers. For example, if a column is assigned the number 1, then the processor 110 may display a divider such as divider 315 on the left side of the column, and a divider such as divider 310 on the right side of the column. If the column is assigned the number 4, then the processor 110 may display a divider such as divider 315 on both sides of the column to separate it from adjacent columns, etc.

Another embodiment of the present invention permits a user to search within a displayed tabular array of data for records that include data elements that match the search criterion, and to very quickly browse the table for matching records. In one embodiment, the processor 110 may receive an instruction, e.g., a user-instruction, to search within a particular column of a table for data elements, e.g., records, that comply with search criteria. For example, each row of the table may include data of a corresponding record. A user may instruct the processor 110 to search for records that include in a particular column data that match a particular character string, such as "Germany." The processor 110 may perform the search and highlight the matching records. The processor 110 may also display the records so that records that include the matching data are grouped together, e.g., in the first rows of the table.

In another embodiment of the present invention, the processor 110 may receive an instruction to search within all columns of the table for the matching data elements. A number of matching records may include matching data elements in different columns, so that within a number of the columns, different rows include the matching data elements. Accordingly, to facilitate browsing, aside from grouping together all matching records, the processor 110 may highlight all the matching records within, for example, a "base" column, typically a column that is selected by the processor 110 according to predefined rules, even if the matching data of a record is not within the base column. In this way, users may scroll through multiple records and quickly determine whether a record satisfied the search criterion.

Figure 4:
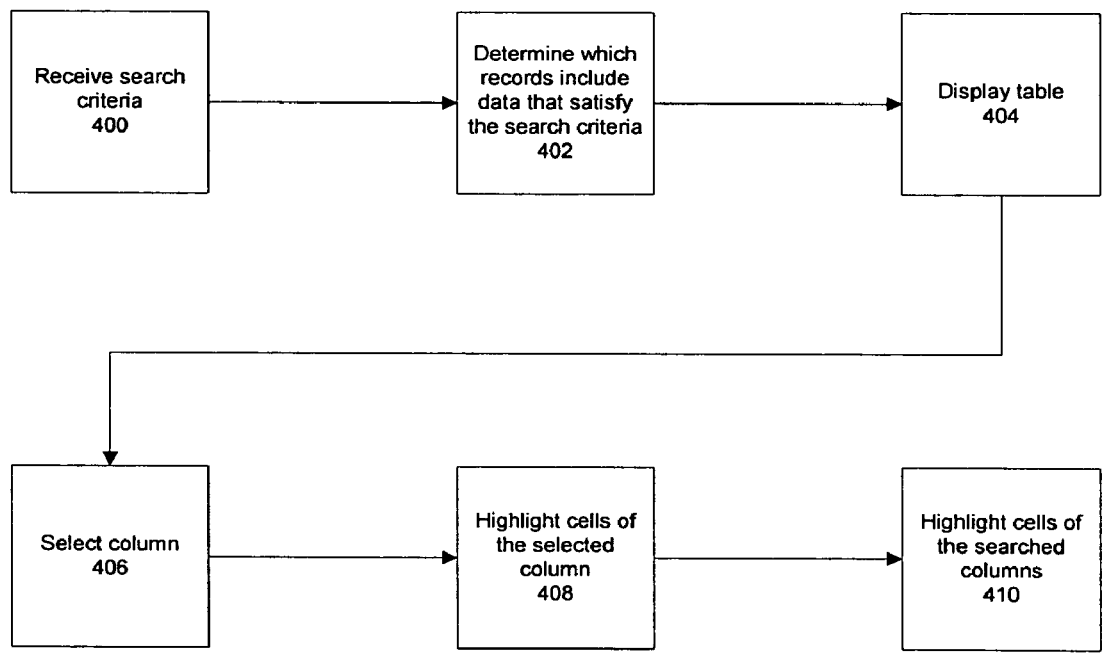
FIG. 4 is a flowchart that illustrates an example procedure for providing results to a search instruction, according to an embodiment of the present invention.

FIG. 4 is a flowchart that illustrates an example procedure executed by a processor to display a table in response to a search instruction, according to an embodiment of the present invention. In 400, the processor may receive search criteria. The search criteria may include a search parameter, e.g., a character string, and an identification of columns to be searched. In 402, the processor may determine which records include data that satisfy the search criteria. For example, the processor may determine which records include data which match an input character string. In 404, the processor may display a table in which rows that correspond to matching records are grouped together in one section of the table, and in which rows that correspond to non-matching records are grouped together in another section of the table. In 406, the processor may select one or more columns in which to highlight all cells that correspond to records that include matching data in any of the searched columns. In 408, the processor may accordingly highlight said cells. In 410, the processor may highlight, in each of the searched columns, the cells that include matching data.

Figure 5:
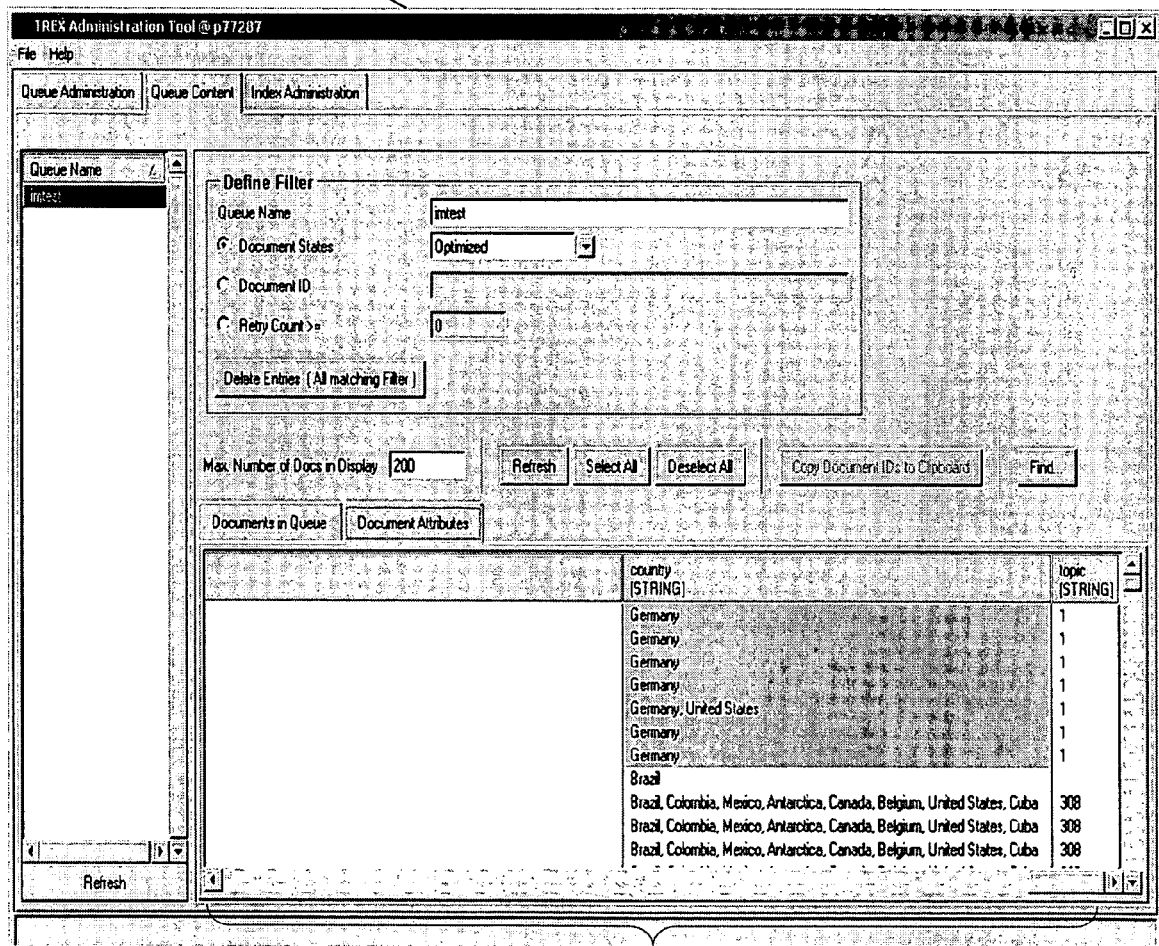
FIG. 5 is a screenshot of an example window displayed in response to receiving a search instruction, according to an embodiment of the present invention.

FIG. 5 is a screenshot of an example window 500 displayed by the processor 110 of FIG. 1 on the computer monitor 115 in response to receiving a search instruction, according to an embodiment of the present invention. In an embodiment of the present invention, the processor 110 may analyze data in each row of the selected column to determine whether the data satisfies the user-input search criteria. For example, the processor 110 may compare the data to a user-input character string. The processor 110 may rearrange the order in which the records of the table are listed so that the records that include matching data in the selected column are grouped together as illustrated in FIG. 5. For example, the processor 110 may display all records that satisfy the search criteria in the first rows of the table 502, and may display all remaining records below the matching records, or vice versa. The processor 110 may sort each of the former and latter groups of records according to any conventional sorting scheme, e.g., in numerical order of the records' assigned document IDs.

To indicate that a particular record includes matching data, the processor 110 may highlight a row of the table that corresponds to the record. For example, the processor 110 may highlight the entire row, a cell that corresponds to the row and the selected column, or the matching data itself.

Figure 6:
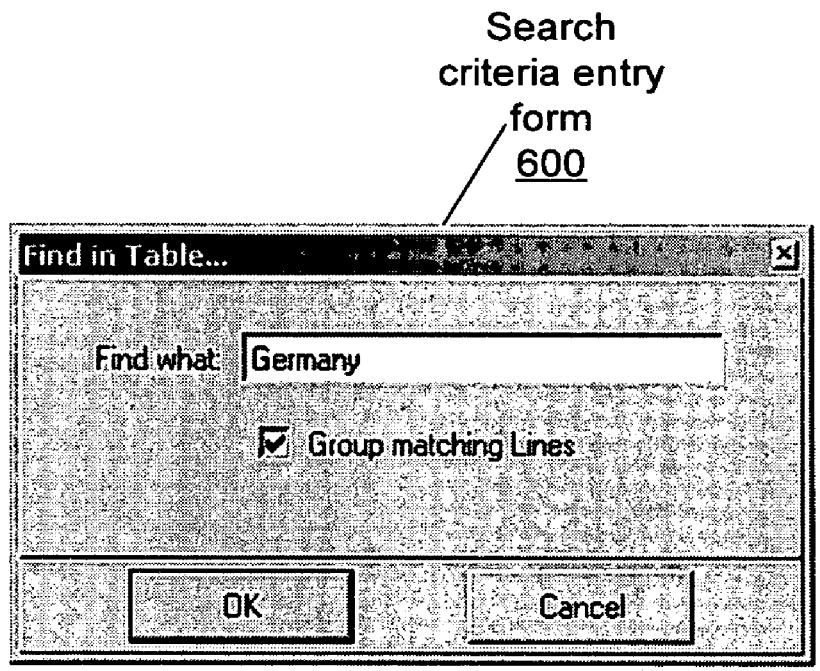
FIG. 6 is a screenshot of a search criteria entry form, according to an embodiment of the present invention.

In an embodiment of the present invention, the processor 110 may group the records that include matching data only in response to a user-instruction to do so. For example, the processor 110 may provide a search criteria entry form 600, e.g., as a pop-up window, as illustrated in FIG. 6. The user may enter a character string to which the data is to be compared in the "Find what" entry line. To instruct the processor 110 to group the records that include matching data, the user may check the "Group matching Lines" selection box.

Figure 7:
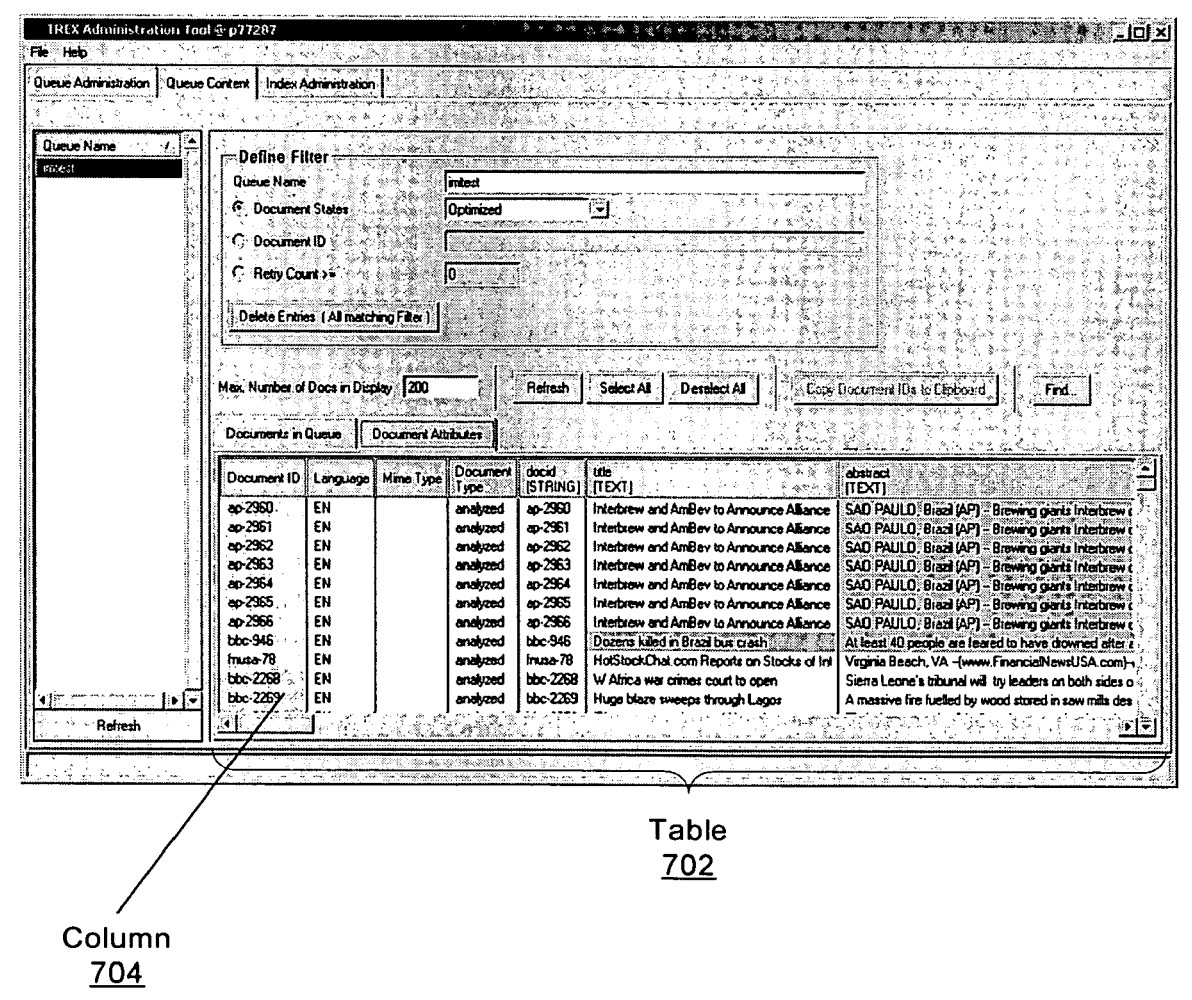

In an embodiment of the present invention, the processor 110 may receive an instruction to search for those records that include matching data in any of the columns of the table, or in any of a plurality of selected columns. In response, the processor 110 may rearrange the order in which the records of the table are listed so that the records that include matching data in any of the searched columns are grouped together as illustrated in FIG. 7.

For each matching record, the processor 110 may highlight the cells in the searched columns that correspond to the record's row and that include matching data. The processor 110 may also highlight in a base column all rows that correspond to records that include matching data in any of the searched columns. For example, all rows of column 704 that correspond to matching records are highlighted. In one embodiment, the user may select the base column. In an alternative embodiment, the processor may select the base column, e.g., according to predefined rules.

In one embodiment of the present invention, the processor 110 may select as the base column a column that does not include matching data. Alternatively, the processor 110 may select the right-most or left-most column of the table 702. Alternatively, the processor 110 may select the column displayed at a left-most or right-most part of a viewing area of the table 702. For example, a user interface may display only a portion of each record at one time. Other portions of the displayed records may be accessed by scrolling the table to bring other portions of the records into view. According to this alternative, as the user scrolls to the left or right so that the left-most or right-most displayed column changes, the processor 110 may accordingly update the base column.

According to either of the latter two alternative embodiments, the processor-selected column may include matching data. Accordingly, the processor 110 may highlight in one color cells of the processor-selected column that do not include matching data, and may highlight in another color cells that do include matching data.

According to an alternative embodiment of the present invention, for each row that includes matching data in any of the searched columns, the processor 110 may highlight the entire row (spanning all columns of the table), including even cells that do not include matching data. According to this alternative, the processor 110 may highlight cells that do not include matching data in one color, and cells that do include matching data in another color.

Those skilled in the art can appreciate from the foregoing description that the present invention can be implemented in a variety of forms. For example, instead of grouping matching rows and displaying graphical demarcations between columns according to the example embodiments set forth above, the present invention can be similarly implemented to group matching columns and display graphical demarcations between rows. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A data display method of a data characterization display machine, comprising:
   for each of a plurality of datasets to be displayed, assigning to the dataset, by a processor of the data characterization display machine, one of four metadata values, and assigning the dataset to a main category, wherein datasets identified by metadata as being related to each other are assigned to a same main category;
   displaying, by the processor, the datasets, such that datasets assigned to a same main category are displayed adjacent to each other;
   for each of the datasets:
   for each of two sides of the dataset, determining, by the processor, which one of two graphical demarcations to display, the determination being made based on which of the four metadata values has been assigned to the dataset; and
   displaying, by the processor, the graphical demarcations;
   wherein the four metadata values include: (1) a first metadata value indicating that a dataset to which it is assigned is at a first end of the main category to which the dataset has been assigned, (2) a second metadata value indicating that a dataset to which it is assigned is at a second end of the main category to which the dataset has been assigned, (3) a third metadata value indicating that a dataset to which it is assigned is not at an end of the main category to which the dataset has been assigned, and (4) a fourth metadata value indicating that a dataset to which it is assigned is an only dataset of the main category to which the dataset has been assigned.

2. The data display method of claim 1, wherein:
   each of the datasets is displayed in a respective column of a table; and
   each column corresponds to a respective subcategory of a respective main category.

3. The data display method of claim 1, wherein:
   between a pair of adjacent ones of the datasets that are assigned to a same main category, a first one of the two graphical demarcations is displayed; and
   between a pair of adjacent ones of the datasets that are assigned to different main categories, a second one of the two graphical demarcations is displayed.

4. A data display method of a data characterization display machine, comprising:
   for each of a plurality of columns of fields of data to be displayed, assigning to the column, by a processor of the data characterization display machine, one of four metadata values, and assigning the column to a column-group, wherein columns identified by metadata as being related to each other are assigned to a same column-group;
   displaying, by the processor, the columns, such that columns assigned to a same column-group are displayed adjacent to each other;
   for each of the columns: for each of a right side and a left side of the column, determining, by the processor, which one of two graphical demarcations to display, the determination being made based on which of the four metadata values has been assigned to the column; and
   displaying, by the processor, the graphical demarcations;
   wherein the four metadata values includes: (1) a first metadata value indicating that a column to which it is assigned is at left-most position of the column-group to which the column has been assigned, (2) a second metadata value indicating that a column to which it is assigned is at a right-most position of the column-group to which the column has been assigned, (3) a third metadata value indicating that a column to which it is assigned is not at an edge of the column-group to which the column has been assigned, and (4) a fourth metadata value indicating that a column to which it is assigned is an only column of the column-group to which the column has been assigned.

5. A data display method of a data characterization display machine, comprising:

for each of a plurality of datasets to be displayed, assigning to the dataset, by a processor of the data characterization display machine, at least one of three metadata values, and assigning the dataset to a main category, wherein datasets identified by metadata as being related to each other are assigned to a same main category;

displaying, by the processor, the datasets, such that datasets assigned a same main category are displayed adjacent to each other;

for each of the datasets:

for each of two sides of the dataset, determining, by the processor, which one of two graphical demarcations to display, the determination being made based on which of the three metadata values has been assigned to the dataset; and displaying, by the processor, the graphical demarcations;

wherein the three metadata values include: (1) a first metadata value indicating that a dataset to which it is assigned is at a first end of the main category to which the dataset has been assigned, (2) a second metadata value indicating that a dataset to which it is assigned is at a second end of the main category to which the dataset has been assigned, and (3) a third metadata value indicating that a dataset to which it is assigned is not at an end of the main category to which the dataset has been assigned.

* * * * *